United States Patent
Kwak et al.

(10) Patent No.: US 11,097,416 B2
(45) Date of Patent: Aug. 24, 2021

(54) MOBILE ROBOT SYSTEM, MOBILE ROBOT, AND METHOD OF CONTROLLING THE MOBILE ROBOT SYSTEM

(71) Applicant: SAMSUNG ELECTRONICS CO., LTD., Suwon-si (KR)

(72) Inventors: No San Kwak, Suwon-si (KR); Mi Jeong Song, Suwon-si (KR); Kyung Shik Roh, Seongnam-si (KR); Soon Yong Park, Bucheon-si (KR); Bo Kyung Kim, Suwon-si (KR); Ji Ho Seo, Suwon-si (KR); Si Ho Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 192 days.

(21) Appl. No.: 15/786,894

(22) Filed: Oct. 18, 2017

(65) Prior Publication Data
US 2018/0133895 A1  May 17, 2018

(30) Foreign Application Priority Data
Nov. 17, 2016 (KR) .................. 10-2016-0153535

(51) Int. Cl.
G06F 19/00 (2018.01)
B25J 9/16 (2006.01)
(Continued)

(52) U.S. Cl.
CPC ............ *B25J 9/163* (2013.01); *G05D 1/0027* (2013.01); *G05D 1/0221* (2013.01);
(Continued)

(58) Field of Classification Search
CPC ........ H04W 4/029; H04W 4/33; G06N 20/00; G06N 3/008; G06N 3/08; G01C 15/002;
(Continued)

(56) References Cited

U.S. PATENT DOCUMENTS

| 8,022,812 B2* | 9/2011 | Beniyama ............... G05D 1/024 340/10.1 |
| 8,386,078 B1* | 2/2013 | Hickman ............... G06F 16/182 700/245 |

(Continued)

FOREIGN PATENT DOCUMENTS

| JP | 2012126193 A | * | 7/2012 |
| KR | 10-2013-0030943 | | 3/2013 |
| WO | 2016/027957 | | 2/2016 |

OTHER PUBLICATIONS

Real-time Localization in Outdoor Environments using Stereo Vision and Inexpensive GPS; Motilal Agrawal and Kurt Konolige (Year: 2006).*

(Continued)

*Primary Examiner* — Abby Y Lin
*Assistant Examiner* — Sohana Tanju Khayer
(74) *Attorney, Agent, or Firm* — Nixon & Vanderhye P.C.

(57) ABSTRACT

Disclosed are a mobile robot system including a server of creating and storing traveling information about moving space and a mobile robot of travelling on the moving space, wherein the mobile robot comprises a driving portion configured to move the mobile robot, a communication device configured to receive the traveling information from the server and a controller configured to control the driving portion based on the traveling information received from the communication device and wherein the server receives information about the moving space from at least one external robot, and creates the traveling information based on the information about the moving space.

15 Claims, 11 Drawing Sheets

(51) Int. Cl.
| | |
|---|---|
| *G06N 20/00* | (2019.01) |
| *H04W 4/029* | (2018.01) |
| *H04W 4/33* | (2018.01) |
| *G05D 1/02* | (2020.01) |
| *G05D 1/00* | (2006.01) |
| *G06N 3/00* | (2006.01) |
| *G06N 3/08* | (2006.01) |

(52) U.S. Cl.
CPC .......... *G05D 1/0274* (2013.01); *G05D 1/0282* (2013.01); *G05D 1/0287* (2013.01); *G06N 3/008* (2013.01); *G06N 20/00* (2019.01); *H04W 4/029* (2018.02); *H04W 4/33* (2018.02); *G05B 2219/40494* (2013.01); *G05D 2201/0215* (2013.01); *G06N 3/08* (2013.01)

(58) Field of Classification Search
CPC .......... G01C 7/04; G01C 21/20; G01C 21/34; G01C 15/00; G01C 15/02; G01C 15/06; G01S 17/42; G01S 17/89; G01S 17/023; G01S 7/4813; G01S 7/4817; G01S 17/36; G01S 17/87; G01S 7/003; G01S 7/4808; G01S 17/88; G01S 13/867; G01S 17/08; G01S 17/10; G01S 19/42; G01S 1/70; G01S 2013/9367; G01S 5/16; G01S 7/4812; G01S 7/4815; G01S 7/4816; G01B 11/002; G01B 5/008; G01B 11/005; G01B 21/047; G01B 5/012; G01B 11/272; G01B 2210/58; G01B 11/2509; G01B 11/2513; G01B 11/007; G01B 11/14; G01B 1/00; G05D 1/024; G05D 1/0274; G05D 2201/0207; G05D 1/0234; G05D 1/0246; G05D 1/0253; G05D 1/0088; G05D 1/0261; G05D 1/0044; G05D 1/102; G05D 2201/0216; G05D 1/0282; G05D 1/0287; G05D 1/0027; G05D 1/0221; G05D 2201/0215; G09B 29/004; B25J 9/163; B25J 9/1666; B25J 9/1664; G05B 2219/40494; Y10S 901/01

See application file for complete search history.

(56) References Cited

U.S. PATENT DOCUMENTS

| | | | |
|---|---|---|---|
| 8,447,863 B1* | 5/2013 | Francis, Jr. ......... | G06F 16/2468 709/226 |
| 8,793,205 B1 | 7/2014 | Fisher et al. | |
| 2006/0095170 A1 | 5/2006 | Yang et al. | |
| 2007/0219667 A1 | 9/2007 | Jung et al. | |
| 2007/0276541 A1 | 11/2007 | Sawasaki | |
| 2011/0194755 A1 | 8/2011 | Jeong et al. | |
| 2012/0323431 A1 | 12/2012 | Wong et al. | |
| 2013/0056032 A1 | 3/2013 | Choe et al. | |
| 2014/0207282 A1* | 7/2014 | Angle ................... | H04L 67/125 700/257 |
| 2016/0055677 A1 | 2/2016 | Kuffner | |
| 2016/0259994 A1* | 9/2016 | Ravindran ............... | G06N 3/08 |
| 2017/0169358 A1* | 6/2017 | Choi .................... | G06F 16/9535 |
| 2017/0213070 A1* | 7/2017 | Aghamohammadi ... | B25J 9/163 |
| 2017/0252922 A1* | 9/2017 | Levine ................. | G06N 3/0454 |
| 2018/0150079 A1* | 5/2018 | Isozaki ................ | G05D 1/0217 |
| 2019/0361672 A1* | 11/2019 | Odhner ................. | B25J 9/1697 |

OTHER PUBLICATIONS

Machine translation of JP 2012-126193 (Year: 2012).*
Artificial Intelligence | definition in the Cambridge English Dictionary <https://dictionary.cambridge.org/us/dictionary/english/artificial-intelligence> (Year: 2020).*
Deep Learning | definition in the Cambridge English Dictionary <https://dictionary.cambridge.org/us/dictionary/english/deep-learning> (Year: 2020).*
Search Report dated Feb. 5, 2018 in counterpart International Patent Application No. PCT/KR2017/011655.
Extended European Search Report dated Oct. 7, 2019 for EP Application No. 17871692.4.
Communication pursuant to Article 94(3) EPC dated Apr. 24, 2020 for EP Application No. 17871692.4.
European Office Action dated Feb. 12, 2021 for EP Application No. 17871692.4.

* cited by examiner

< conceptual view of deep learning >

MOBILE ROBOT SYSTEM, MOBILE ROBOT, AND METHOD OF CONTROLLING THE MOBILE ROBOT SYSTEM

CROSS-REFERENCE TO RELATED APPLICATION

This application is based on and claims priority under 35 U.S.C. § 119 to Korean Patent Application No. 10-2016-0153535, filed on Nov. 17, 2016 in the Korean Intellectual Property Office, the disclosure of which is incorporated by reference herein in its entirety.

BACKGROUND

1. Field

The present disclosure relates generally to a mobile robot system, a mobile robot, and a method of controlling the mobile robot system, and for example, to a technique of receiving information about moving space from an external robot, and performing deep learning based on the information about the moving space to create traveling information.

2. Description of the Related Art

Many kinds of robots have been developed in industrial and technological fields and used as a part of factory automation. Recently, robot applications are expanded more and more so that medical robots, aerospace robots, etc. have been developed, and home mobile robots are also manufactured.

A mobile robot travels autonomously on a specific area without receiving a user's commands to perform a work instructed by the user. Examples of the mobile robot are a cleaning robot, a telepresence robot, and a security robot, and lately, many applications based on mobile robots are being developed.

For example, a function for providing a mobile robot with a network function to enable a user to input a control command to the mobile robot even when the user is far away from the mobile robot, and a function for monitoring an area which a user cannot monitor are being developed. Also, a technique for recognizing the location of a mobile robot and planning a traveling route of the mobile robot using various sensors such as a camera or an obstacle sensor installed in the mobile robot is being developed.

That is, many techniques are being developed to enable mobile robots to travel autonomously and safely in a specific region. Recently, deep learning technology has been developed which is machine learning based on Artificial Neural Network (ANN) for enabling a computer to itself learn using various data like human.

The core of deep learning is prediction through classification. A computer finds patterns from a large amount of data to classify the data, as if a human distinguishes objects. This type of classification can be divided to "supervised learning" and "unsupervised learning".

The supervised learning, which occupies a major portion of typical machine learning algorithms, is to input information about a mobile robot and environmental information to the mobile robot to train the mobile robot. The unsupervised learning is a method in which a computer itself learns using existing data to develop traveling ability, unlike the supervised learning.

The unsupervised learning has higher performance as there is a larger amount of learning data and as learning steps are more segmented. In the unsupervised learning, a user does not need to input all information about environments.

In regard of a mobile robot based on typical supervised learning, a technique of receiving information required for traveling from an external server, and performing traveling based on the received information is being developed. However, the technique is nothing more than a method of receiving information required from a mobile robot from an external server.

Accordingly, since the technique can neither actively receive nor reflect actual information required for traveling of a mobile robot, the technique cannot improve traveling technology. Due to the problem, since a mobile robot cannot acquire sufficient information about new space it moved to, the mobile robot has many difficulties in traveling efficiently.

SUMMARY

Therefore, it is an aspect of the present disclosure to provide a mobile robot system and a mobile robot capable of receiving information about moving space received from another mobile robot from an external server, and then performing deep learning based on the information about the moving space so as to travel safely and flexibly in various environments.

Additional aspects of the disclosure will be set forth in part in the description which follows and, in part, will be obvious from the description, or may be learned by practice of the disclosure.

In accordance with one aspect of the present disclosure, a mobile robot system including a server of creating and storing traveling information about moving space and a mobile robot of travelling on the moving space, wherein the mobile robot comprises a driving portion configured to move the mobile robot, a communication device configured to receive the traveling information from the server and a controller configured to control the driving portion based on the traveling information received from the communication device and wherein the server receives information about the moving space from at least one external robot, and creates the traveling information based on the information about the moving space.

The information about the moving space may be information created based on simulation traveling on the moving space.

The information about the moving space may be traveling-related information acquired when the external robot travels on the moving space.

The traveling-related information may be acquired while the mobile robot is traveling in the moving space The server may perform deep learning based on the information about the moving space to create the traveling information.

The traveling information may include first traveling information, and the controller may create second traveling information based on the first traveling information, and controls the driving portion according to the second traveling information.

The communication device may transmit the information about the moving space acquired when the mobile robot travels, to the server.

The mobile robot system may include a sensor portion configured to sense objects existing in the moving space and an operation portion configured to convey the objects, wherein the server may receive and store information about the objects from at least one of the robot and the external robot.

The server may not receive information about objects set by a user.

In accordance with another aspect of the present disclosure, a mobile robot may include a main body, a driving portion configured to move the main body, a communication device configured to receive information about moving space from an external server and a controller configured to create traveling information about the moving space based on the information about the moving space received from the communication device, and to control the driving portion according to the traveling information, wherein the traveling information may be created based on the information about the moving space received from at least one another external robot.

The information about the moving space may be created based on simulation traveling on the moving space.

The traveling-related information may include at least one of operation information of a sensor installed in the external robot, traveling speed information, and traveling direction information, acquired when the external robot travels on the moving space.

The traveling-related information may include at least one of operation information of a sensor installed in the external robot, traveling speed information, and traveling direction information, acquired when the external robot travels on the moving space.

The controller may perform deep learning based on the information about the moving space to create the traveling information.

In accordance with other aspect of the present disclosure, a method of controlling a mobile robot system comprise receiving information about moving space from at least one external robot, creating traveling information about the moving space based on the information about the moving space and receiving the traveling information, and controlling traveling of a mobile robot based on the traveling information.

The information about the moving space may be created based on simulation traveling on the moving space.

The information about the moving space may be traveling-related information acquired when the external robot travels on the moving space.

The creating of the traveling information may include performing deep learning based on the information about the moving space to create the traveling information.

The method of controlling a mobile robot system may include transmit information about the moving space acquired when the mobile robot travels, to a server.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
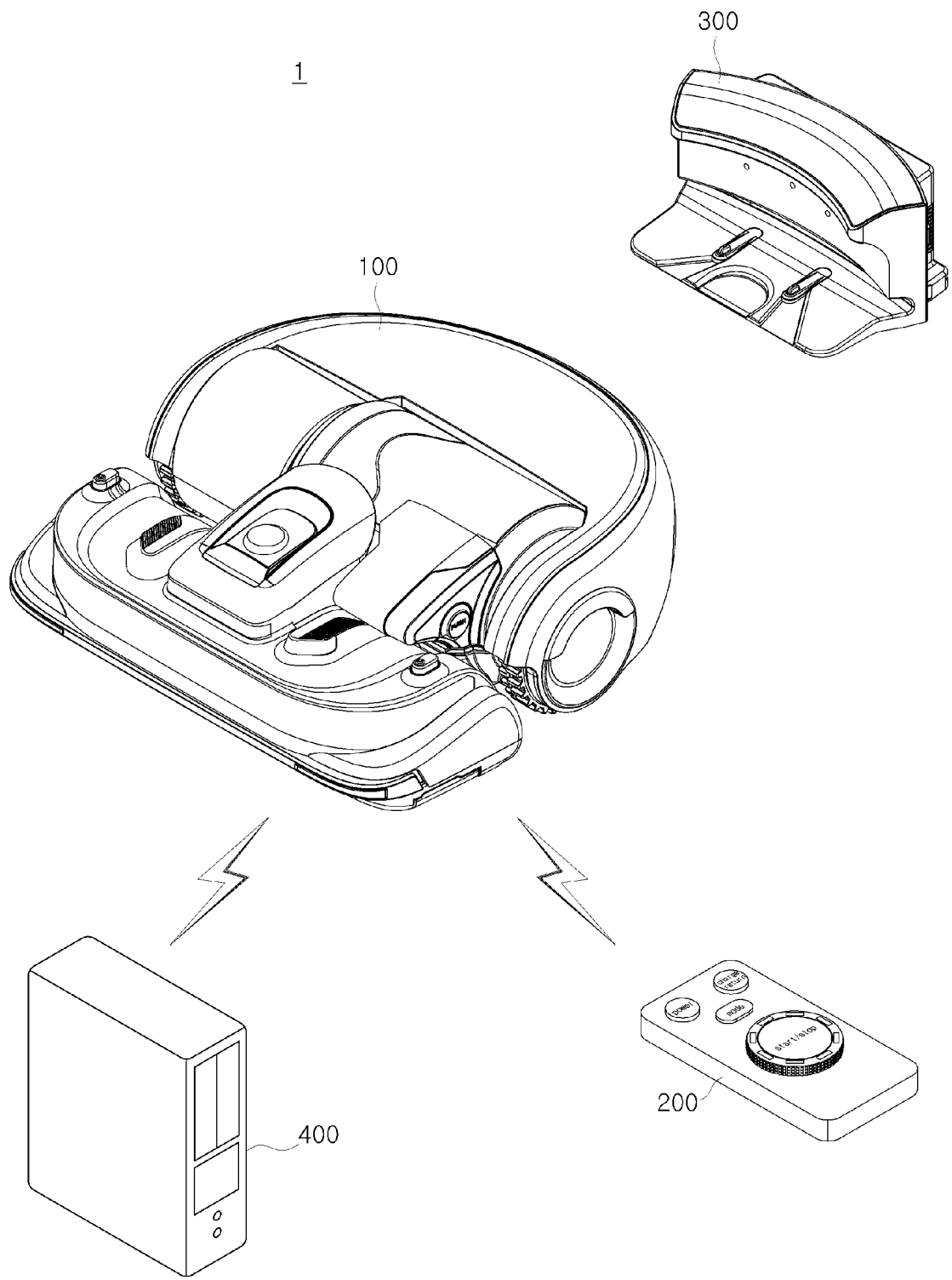
FIG. 1 shows a configuration of a mobile robot system according to an embodiment of the present disclosure.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

The terms used in the present specification are used to describe the embodiments of the present disclosure. Accordingly, it should be apparent to those skilled in the art that the following description of exemplary embodiments of the present invention is provided for illustration purpose only and not for the purpose of limiting the invention as defined by the appended claims and their equivalents. It is to be understood that the singular forms "a," "an," and "the" include plural referents unless the context clearly dictates otherwise.

It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, the embodiments of the present disclosure will be described in detail with reference to the accompanying drawings so that one of ordinary skill in the art can easily embody the present disclosure. Also, in the drawings, descriptions about parts irrelevant to the present disclosure will be omitted in order to clearly describe the present disclosure.

Also, for convenience of description, the drawings relates to a cleaning robot, however, the configuration and operation principle of the present disclosure can be applied to all robots that can move.

FIG. 1 shows a configuration of a mobile robot system according to an embodiment of the present disclosure.

Referring to FIG. 1, a mobile robot system 1 according to an embodiment of the present disclosure may include a mobile robot 100 to autonomously move on a predetermined area to perform a work, a device 200 separated from the mobile robot 100 and configured to remotely control the mobile robot 100, a charging station 300 separated from the mobile robot 100 and configured to charge power in a battery of the mobile robot 100, and a server 400 to store various information about traveling space.

The mobile robot 100 may receive a control command from the device 200 to perform operation corresponding to the control command. The mobile robot 100 may include a chargeable battery (not shown) and an obstacle sensor to avoid obstacles during traveling to perform a work while autonomously travelling on a working area.

Also, the mobile robot 100 may perform localization of recognizing its own location through a sensor portion 130 (see FIG. 3) without acquiring advance information about a surrounding environment, and map-building of building a map from the information about the surrounding environment. That is, the mobile robot 100 may perform Visual Simultaneous Localization and Mapping (VSLAM).

The device 200, which is a remote control device of wirelessly transmitting control commands for controlling movements of the mobile robot 100 or performing a work of the mobile robot 100, may include a cell phone (for example, a Personal Communications Service (PCS) phone), a smart phone, Personal Digital Assistants (PDA), a Portable Multimedia Player (PMP), a laptop computer, a digital broadcasting terminal, a netbook, a tablet, a navigation, and the like.

Also, the device 200 may include all kinds of devices capable of performing various functions using various application programs, such as a digital camera or a camcorder in which a wired/wireless communication function is installed.

Also, the device 200 may be a general remote controller having a simple structure. The remote controller may transmit/receive signals to/from the mobile robot 100 using Infrared Data Association (IrDA).

Also, the device 200 may transmit/receive wireless communication signals to/from the mobile robot 100 using various communication methods, such as Radio Frequency (RF) communication, Wireless Fidelity (Wi-Fi), Bluetooth, Zigbee, Near Field Communication (NFC), Ultra-Wide Band (UWB) communication, etc. However, the device 200 can use any other communication method as long as it can transmit/receive wireless communication signals to/from the mobile robot 100.

Also, the device 200 may include a power button to control power on/off of the mobile robot 100, a charge return button to instruct a return to the charging station 300 in order to charge the battery of the mobile robot 100, a mode button to change a control mode of the mobile robot 100, a start/stop button to start/stop operation of the mobile robot 100 or to start, cancel, or check a control command, a dial, etc.

The charging station 300 may be used to charge the battery of the mobile robot 100, and may include a guide member (not shown) to guide docking of the mobile robot 100. The guide member may include a connection terminal (not shown) to charge a power supply of the mobile robot 100.

The server 400 may function to receive information about moving space from the mobile robot 100 and another external mobile robot 100, and store the received information. Also, the server 400 may create traveling information about moving space on which the mobile robot 100 moves, based on the received information about the moving space, and transmit the traveling information to the mobile robot 100. Details about the server 400 will be described with reference to FIGS. 3 and 4, later.

Figure 2A:
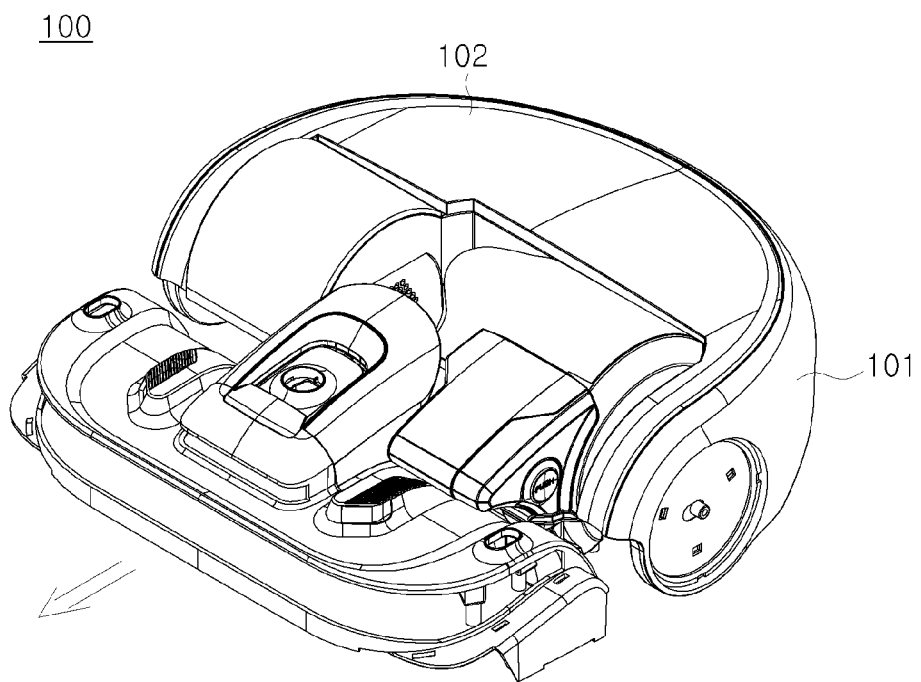
FIGS. 2A and 2B schematically show an outer appearance of a mobile robot according to an embodiment of the present disclosure.
Figure 2B:
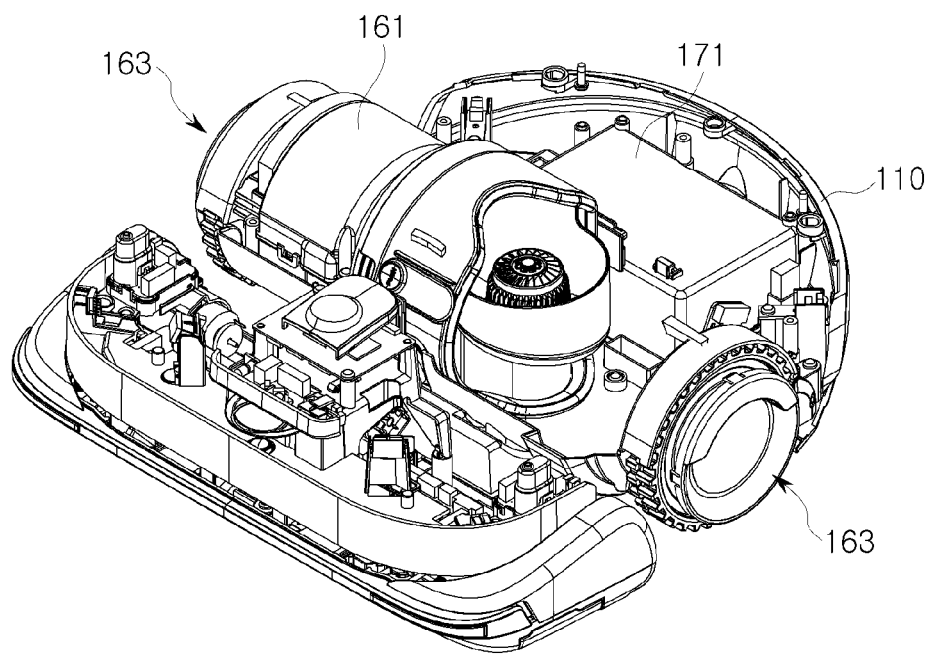

FIGS. 2A and 2B schematically show an outer appearance of a mobile robot according to an embodiment of the present disclosure.

Referring to FIG. 2, the mobile robot 100 may include a main body 101 forming an outer appearance of the mobile robot 100, a cover 102 covering an upper portion of the main body 101, and a plurality of driving portions 160 to move the main body 101.

The main body 101 forming the outer appearance of the mobile robot 100 may support various components installed in the mobile robot 100.

The power supply 170 may include a battery electrically connected to the driving portions 160 and loads for driving the main body 101 to supply driving power. The battery may be a rechargeable secondary battery, and receive power from the charging station 300 to be charged, when the main body 101 completes a work and then is coupled with the charging station 300.

Also, the power supply 170 may receive charging current from the charging station 300 to be charged, when a charge level is low.

Also, in the front portion of the main body 101, a caster wheel may be installed to change a rotation angle according to a state of a floor surface on which the mobile robot 100 moves. The caster wheel may be used to stabilize a position of the mobile robot 100 and to prevent the mobile robot 100 from falling, thereby supporting the mobile robot 100. The caster wheel may be a wheel formed in the shape of a roller or a caster.

Figure 3:
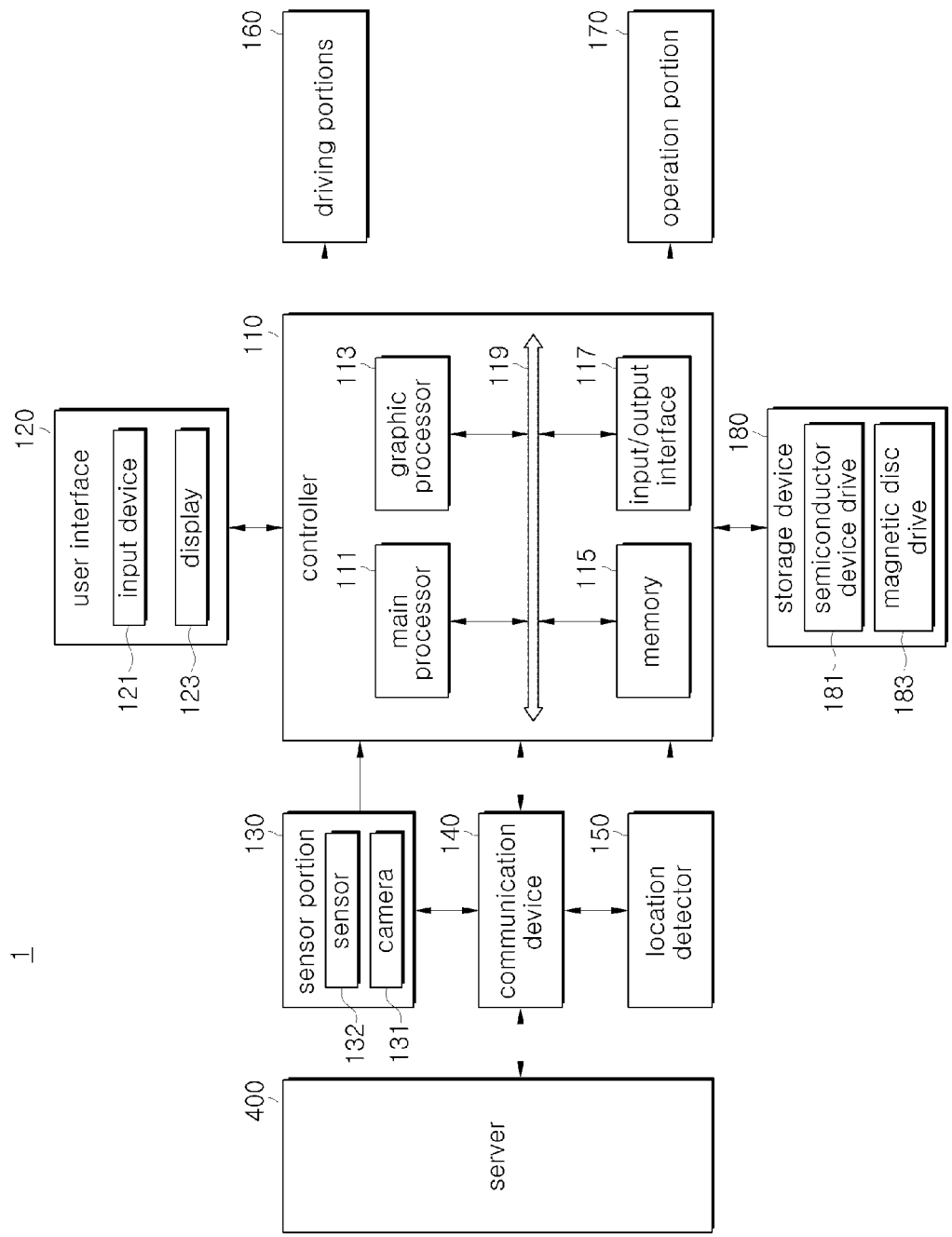
FIG. 3 is a block diagram showing a configuration of a mobile robot system.

FIG. 3 is a configuration view of a mobile robot system according to an embodiment of the present disclosure.

Referring to FIG. 3, a mobile robot system 1 according to an embodiment of the present disclosure may further include a controller 110, a user interface 120, a sensor portion 130, a communication device 140, a location detector 150, a plurality of driving portions 160, an operation portion 170, and a storage device 180, in addition to the components shown in FIG. 1.

The user interface 120 may be mounted on an upper portion of the main body 101 of the mobile robot 100, and may include an input button 121 to receive control commands from a user, and a display 123 to display operation information of the mobile robot 100.

The input button 121 may include a power button to turn on/off the mobile robot 100, a start/stop button to start or stop the mobile robot 100, and a return button to return the mobile robot 100 to the charging station 300.

Also, the input button 121 may be a push switch to sense pressure applied by the user, a membrane switch, or a touch switch to sense a contact by a user's body part.

The display 123 may display information of the mobile robot 100 in response to a control command input by the user. For example, the display 123 may display an operation state of the mobile robot 100, a power on/off state, a cleaning mode selected by the user, whether to return to the charging station 300, etc.

Also, the display 123 may be a Light Emitting Diode (LED) or an Organic Light Emitting Diode (OLED) which are self-luminous devices, or a Liquid Crystal Display (LCD) having a separate light source.

Also, although not shown in the drawings, according to an embodiment, the user interface may include a Touch Screen Panel (TSP) to receive a control command from the user and to display operation information corresponding to the received control command.

The TSP may include a display to display operation information and control commands that can be input by the user, a touch panel to detect contact coordinates that the user's body part contacts, and a touch screen controller to determine a command input by the user based on contact coordinates detected by the touch panel.

The sensor portion 130 may include at least one camera 131 and a sensor 132, and may function to acquire various data of an environment in which the mobile robot 100 is currently located.

The camera 131 may capture frames which are outside images, and convert the frames to digital signals. The camera 131 may be configured with a Charge Coupled Device (CCD) module or a Complementary Metal Oxide Semiconductor (CMOS) module.

More specifically, although not shown in FIG. 3, the sensor portion 130 may include a module to convert a surrounding image of the mobile robot 100 to an electrical signal that can be processed by the controller 110, and to transfer an electrical signal corresponding to an upper image to the controller 110.

In the present disclosure, an image provided by the camera 131 may be used for the controller 110 to detect a location of the mobile robot 100.

The sensor 132 may recognize objects existing in space where the mobile robot 100 travels. The sensor 132 may measure a distance to a target object to acquire distance data of a real environment where the mobile robot 100 is located.

Accordingly, the sensor 132 may include various kinds of sensors, for example, a 2Dimensional (2D) sensor or a 3Dimensional (3D) sensor, to acquire data. The 3D sensor may be KINECT (RGB-D sensor), TOF (Structured Light Sensor), or a stereo camera, although not limited to these. That is, the 3D sensor may be any other device as long as it can perform the similar function.

Also, in the present disclosure, the camera 131 and the sensor 132 are used as means for receiving data about a current location of the mobile robot 100, however, any other device capable of acquiring surroundings images can be used.

The communication device 140 may function to transmit/receive various information about the mobile robot 100 and various traveling-related information to/from the server 400 located outside the mobile robot 100 in a wireless fashion.

More specifically, the communication device 140 may receive information about moving space received by another external robot and stored in the server 400, or traveling information created based on the information about the moving space, from the server 400, and transmit traveling information acquired by the mobile robot 100 during traveling to the server 400.

Accordingly, the communication device 140 may transmit/receive wireless communication signals to/from the server 400 using various communication methods, such as RF communication, Wi-Fi, Bluetooth, Zigbee, NFC, UWB communication, etc. However, the communication device 140 may use any other method as long as it can transmit/receive wireless communication signals to/from the server 400.

The location detector 150 may measure a visual traveling distance through images photographed by the sensor portion 130. In order to measure the visual traveling distance, the location detector 150 may remove motion blurs from the photographed images to acquire clear images, and compare the clear images to detect a location of the mobile robot 100.

The driving portions 160 may be respectively disposed at both sides of a center portion of the main body 101 so that the main body 101 can move forward or backward or rotate while performing a work. Overall operations of the driving portions 160 may be controlled according to commands from the controller 110.

The driving portions 160 may rotate forward or backward according to a command from the controller 110 which will be described later to cause the mobile robot 100 to move forward or backward or rotate.

For example, the driving portions 160 may rotate forward or backward to cause the mobile robot 100 to move forward or backward. Also, if the left driving portion 160 rotates backward and the right driving portion 160 rotates forward, the mobile robot 100 may rotate in a left direction with respect to a front direction, and if the right driving portion 160 rotates backward and the left driving portion 160 rotates forward, the mobile robot 100 may rotate in a right direction with respect to the front direction.

The driving portions 160 may move the mobile robot 100, and may include a wheel driving motor 161 and a plurality of driving wheels 163, as shown in FIG. 2.

The driving wheels 163 may be disposed at both sides of a bottom of the main body 101, and may include a left driving wheel disposed at a left side of the mobile robot 100 with respect to the front direction of the mobile robot 100, and a right driving wheel disposed at a right side of the mobile robot 100 with respect to the front direction of the mobile robot 100.

Meanwhile, the driving wheels 163 may receive a rotational force from the wheel driving motor 161 to move the mobile robot 100.

The wheel driving motor 161 may generate a rotational force for rotating the driving wheels 163, and include a left driving motor for rotating the left driving wheel and a right driving motor for rotating the right driving wheel.

The left driving motor and the right driving motor may receive driving control signals from the controller 110, respectively, to operate independently. The left driving wheel and the right driving wheel may rotate independently by the left driving motor and the right driving motor operating independently.

Also, since the left driving wheel and the right driving wheel can rotate independently, the mobile robot 100 can perform various driving, such as forward driving, backward driving, rotational driving, rotation in place, etc.

Also, the driving portions 160 may further include a motor driving circuit (not shown) to supply driving current to the wheel driving motor 163 according to a control signal from the controller 110, a power transfer module (not shown) to transfer a rotational force of the wheel driving motor 161 to the driving wheels 163, and a rotation sensor (not shown) to detect a rotational displacement and rotation speed of the wheel driving motor 161 or the driving wheels 163.

The operation portion 170 may function to perform various operations according to a user's commands, except for the function of the driving portions 160 of moving the mobile robot 100 to a specific location. Accordingly, if the mobile robot 100 is a cleaning robot, the operation portion 170 may perform cleaning, and if the mobile robot 100 is a transport robot, the operation portion 170 may be means for transporting an object, for example, a component for performing a function that is similar to that of a human's arms.

Overall operations of the operation portion 170 may be controlled by the controller 110, and the controller 110 may control the operation portion 170 based on information about an object received through the communication device 140 to perform a user's command.

More specifically, if an object is sensed by the sensor portion 130 in moving space, the communication device 140 may request the server 400 to transmit information about the sensed object. Then, the server 400 may search information about the sensed object, and if information about the sensed object is found, the server 400 may transmit the information about the sensed object to the communication device 140.

If no information about the sensed object is found, the server 400 may receive information about the sensed object from another external robot, decide an optimized use method for the object based on the received information, and transmit the method to the communication device 140.

Thereafter, the controller 110 may control the operation portion 170 based on the optimized use method for the object to perform the user's command. Details about the operation of the controller 110 will be described with reference to FIG. 10, later.

The storage device 180 may be memory to store images photographed by the camera 141 in real time, and to store a map of an environment where the mobile robot 100 operates, operation programs and driving patterns for movement of the mobile robot 100, and location information and obstacle information of the mobile robot 100 acquired during traveling.

Also, the storage device 180 may store user input information, such as control data for controlling operation of the mobile robot 100, reference data used to control operation of the mobile robot 100, operation data generated when the mobile robot 100 performs predetermined operation, and setting data input by the device 200 to enable the mobile robot 100 to perform predetermined operation.

Meanwhile, the storage device 180 may function as an auxiliary storage device to assist memory 115 included in the controller 110 which will be described below. The storage device 180 may be non-volatile storage medium in which stored data is not lost even when the mobile robot 100 is powered off.

The storage device 180 may include a semiconductor device drive 181 to store data in a semiconductor device, a magnetic disc drive 183 to store data in a magnetic disc, etc.

The server 400 may receive and store information about moving space from the mobile robot 100 and another external robot 100. Also, the server 400 may create traveling information for moving space on which the mobile robot 100 moves based on the received information about the moving space, through deep learning, and transmit the traveling information to the communication device 140.

Also, the server 400 may perform deep learning using at least one of the information about the moving space transmitted from the mobile robot 100 and the information about the moving space transmitted from the other external robot to create traveling information, and simultaneously perform deep learning based on simulation traveling information to create traveling information. The accuracy of deep learning may become higher as the amount of learning data increases. Accordingly, the server 40 may be connected to the mobile robot 100 or other external robots through a network to collect data required for deep learning.

The server 400 may be a cloud server. The cloud server may be a virtual private server, and may be a type of a virtualization method of partitioning a single physical server into a plurality of servers to use it as a plurality of virtual servers. Details about the deep learning will be described with reference to FIGS. 7, 8, and 9, later.

Also, the server 400 may store various information about objects existing in the moving space, in addition to the information about the moving space and the traveling information.

More specifically, the server 400 may receive and store various information about objects, such as information about a specific object received from a user or another external robot, for example, cautions upon dealing with an object, a method of keeping an object, etc.

Also, the server 400 may transmit the information to the communication device 140, and the controller 110 may perform a user's command optimally based on the received information. Details about the operation of the controller 110 will be described with reference to FIG. 10.

The controller 110 may function to control overall operations of the mobile robot system 100 including the mobile robot 100.

More specifically, the controller 110 may include an input/output interface 117 to enable data transmission/reception between various components included in the mobile robot 100 and the controller 110, the memory 115 to store programs and data, a graphic processor 113 to perform image processing, a main processor 111 to perform operations according to the programs and data stored in the memory 115 and to correct first location information of the mobile robot 100, and a system bus 119 acting as a path for data transmission/reception between the input/output interface 117, the memory 115, the graphic processor 113, and the main processor 111.

The input/output interface 117 may receive images acquired by the sensor portion 130, and location information and results detected by the location detector 140, and transfer the received images or the results of the detection to the main processor 111, the graphic processor 113, and/or the memory 115 through the system bus 119.

Also, the input/output interface 117 may transfer various control signals output from the main processor 111 to the driving portion 160 and various control components of the mobile robot 100.

The memory 115 may load and store control programs and control data for controlling operations of the mobile robot 100 from the storage unit 180, or may temporarily store images acquired by the sensor portion 130, the results of location detection by the obstacle sensor 140, etc.

The memory 115 may be volatile memory, such as Static Random Access Memory (SRAM) or Dynamic Random Access Memory (DRAM). However, the memory 115 may be non-volatile memory, such as flash memory, Read Only Memory (ROM), Erasable Programmable Read Only Memory (EPROM), Electrically Erasable Programmable Read Only Memory (EEPROM), etc.

The graphic processor 113 may convert an image acquired by the sensor portion 130 to a format that can be stored in the memory 115 or the storage unit 180, or the graphic processor 113 may change the resolution or size of an image acquired by the sensor portion 130.

The main processor 111 may process the results of sensing by the sensor portion 130 and the location detector 140 according to programs and data stored in the memory 115, control the driving portions 160, and perform operations for correcting a location of the mobile robot 100 or correcting a map according to the result of the correction.

Also, the controller 110 may control the driving portions 160 and the operation portion 170, based on information about an object and traveling information about the moving space, received by the communication device 140.

More specifically, the controller 110 may receive traveling information created through deep learning by the server 400 through the communication device 140, calculate an optimal traveling path in moving space based on the traveling information to control the driving portions 160, receive information about an object sensed by the sensor portion 130 through the communication device 140, and control the operation device 170 based on the information about the object to perform a user's command.

Also, the controller 110 may perform deep learning that is performed by the server 400. In the above-described embodiment, the server 400 performs deep learning to create traveling information, however, the controller 110 of the mobile robot 100 can also itself perform deep learning to create traveling information. When the mobile robot 100 cannot receive information about moving space or traveling information created by deep learning from the server 400 due to communication problems, the mobile robot 100 can itself perform deep learning to create traveling information. This feature is similar to that of the mobile robot 100 which will be described below with reference to FIGS. 5 and 6.

Also, if the server 400 and the controller 110 have the structures, deep learning that is performed by the controller 110 may be performed by the server 400. Generally, since the controller 110 has a relatively lower level of hardware and software than the server 400, the server 400 may more efficiently perform deep learning than the controller 110. Accordingly, when the controller 110 performs deep learning, the server 400 may perform a highly difficult part of the deep learning to reduce the load of the controller 110.

For example, the server 400 may create first traveling information based on information about moving space received from an external robot, and the controller 110 may create second traveling information based on the first traveling information received through the communication device 140. Also, the controller 110 may control the driving portions 160 based on the second traveling information.

Herein, the first traveling information may be information primarily created through deep learning, and is a superordinate concept to the second traveling information.

For example, the first traveling information may be information about a traveling route for efficiently cleaning an area to clean, and the second traveling information may be information about a situation (for example, obstacle avoidance) that needs to be quickly processed during traveling. A part requiring a lot of tasks upon deep learning may be processed by the server 400, and a part requiring detailed tasks upon deep learning may be processed by the controller 110, thereby more efficiently controlling the mobile robot 100.

Accordingly, in this structure, the controller of the server 400 and the controller 110 of the mobile robot 100 may be configured with the same deep learning network, wherein a relatively low level of a learning machine-based controller may be installed in the mobile robot 100, and a relatively high level of a learning machine-based controller may be installed in the server 400.

So far, the configuration of the mobile robot system 1 has been described with reference to the accompanying drawings. Hereinafter, the flow of operations of the mobile robot system 1 will be described with reference to the accompanying drawings.

Figure 4:
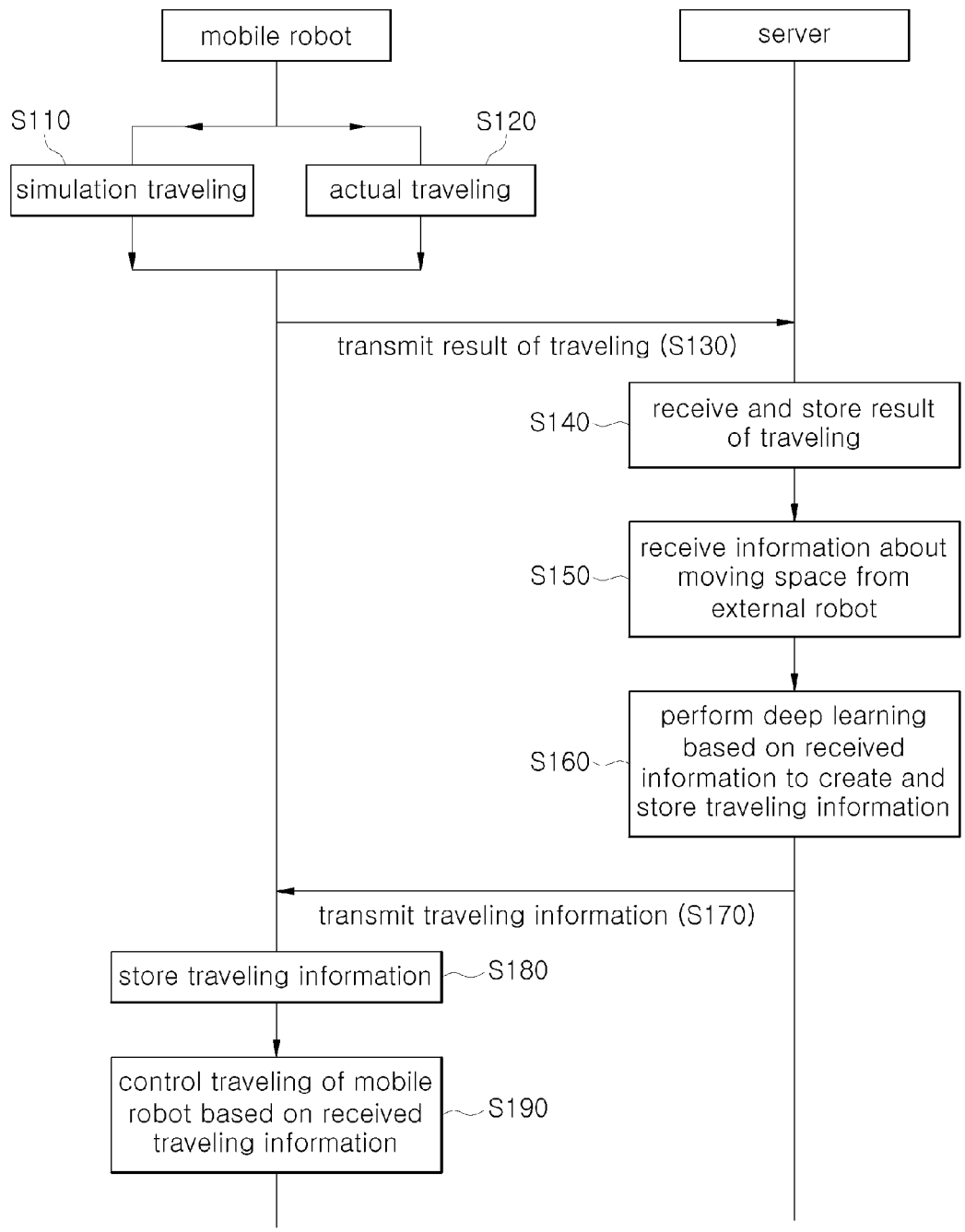
FIG. 4 is a flowchart illustrating a control method of the mobile robot system 1, according to an embodiment of the present disclosure.

FIG. 4 is a flowchart illustrating a control method of the mobile robot system 1, according to an embodiment of the present disclosure.

Referring to FIG. 4, the mobile robot 100 may actually travel on moving space on which it will travel or simulate traveling on the moving space, and transmit the result of the actual traveling or the simulation traveling to the server 400, in operations S110, S120, and S130.

The result of the actual traveling may include various information acquired when the mobile robot 100 travels actually. For example, the result of the actual traveling may include at least one of operation information of the sensor 131, traveling speed information, and traveling direction information. The result of the simulation traveling may include various information about the moving space acquired when the mobile robot 100 simulates traveling.

The server 400 may receive and store the result of the actual traveling or the simulation traveling transmitted from the mobile robot 100, that is, information about moving space, and then receive information about the moving space from an external robot, in operations S140 and S150.

The information about the moving space may include at least one of various information (for example, operation information of a sensor, traveling speed information, and traveling direction information) acquired when the external robot travels on the moving space, as described above in operations S110 and S120. Also, the information about the moving space may include the result of traveling acquired when the external robot performs virtual simulation.

If the server 400 receives the result of the traveling, the server 400 may perform deep learning based on the received information to create traveling information about the moving space and store the traveling information, in operation S160. Then, the server 400 may transmit the created information to the mobile robot 100, in operation S170.

The mobile robot 100 may store the traveling information received from the moving robot 100 in the storage device 180, and simultaneously control driving of the mobile robot 100 based on the traveling information, in operations S180 and S190.

In FIG. 4, operations S150 and S160 in which the server 400 receives information about moving space from the external robot and creates traveling information start after operations S110 and S120 in which the mobile robot 100 travels on the moving space and simulates traveling. However, the server 400 may receive information about moving space from the external robot, without operations S110 and S120.

That is, if the mobile robot 100 enters a new environment that it has never experienced previously and has to immediately travel actually, the mobile robot 100 may receive traveling information created through deep learning from the server 400, and travel based on the traveling information.

So far, the configuration and operation flow of the mobile robot system 1 according to an embodiment of the present disclosure has been described. Hereinafter, the configuration and operation of a mobile robot 100 according to another embodiment of the present disclosure will be described.

Figure 5:
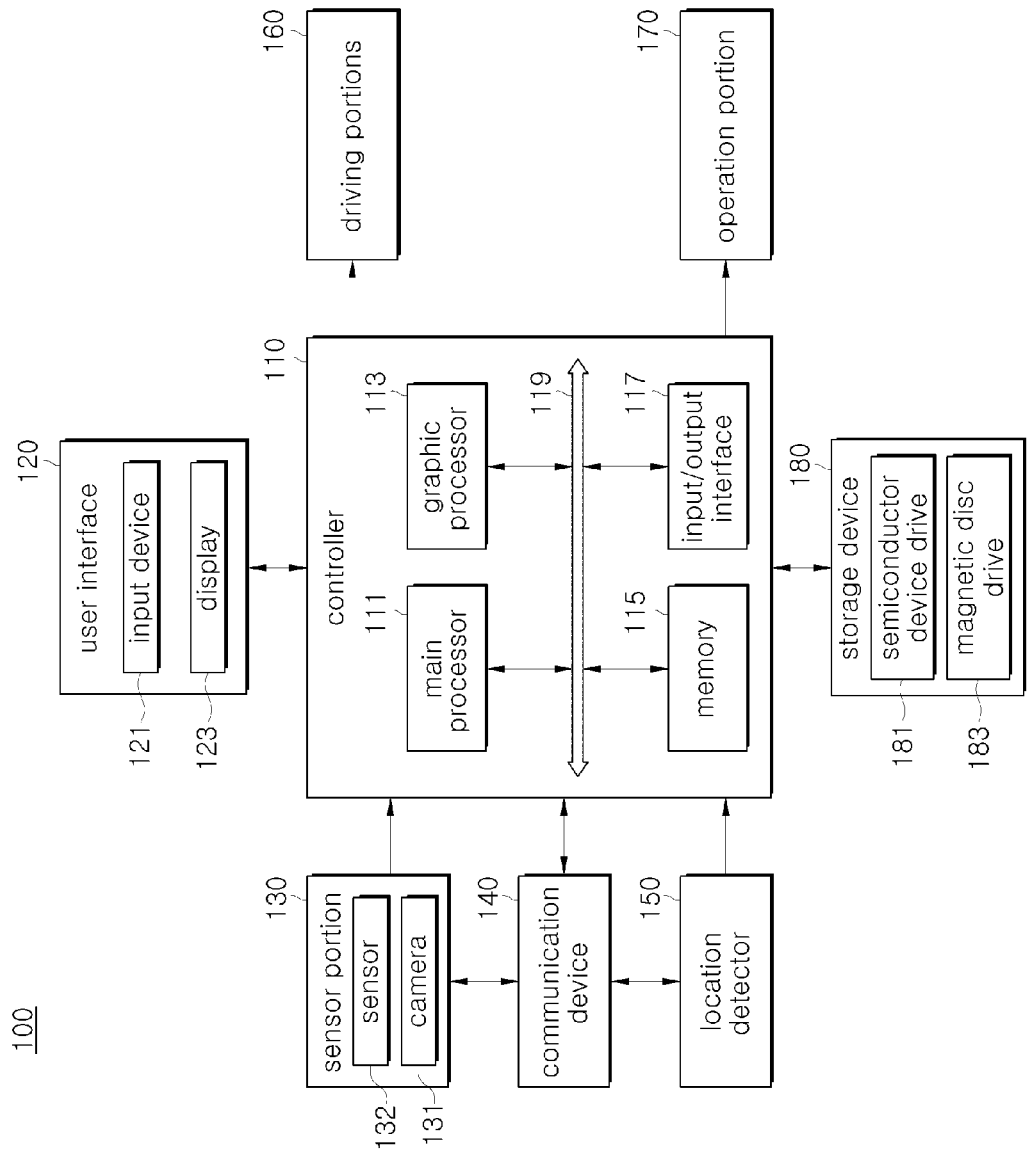
FIG. 5 is a block diagram showing a configuration of a mobile robot according to an embodiment of the present disclosure.
Figure 6:
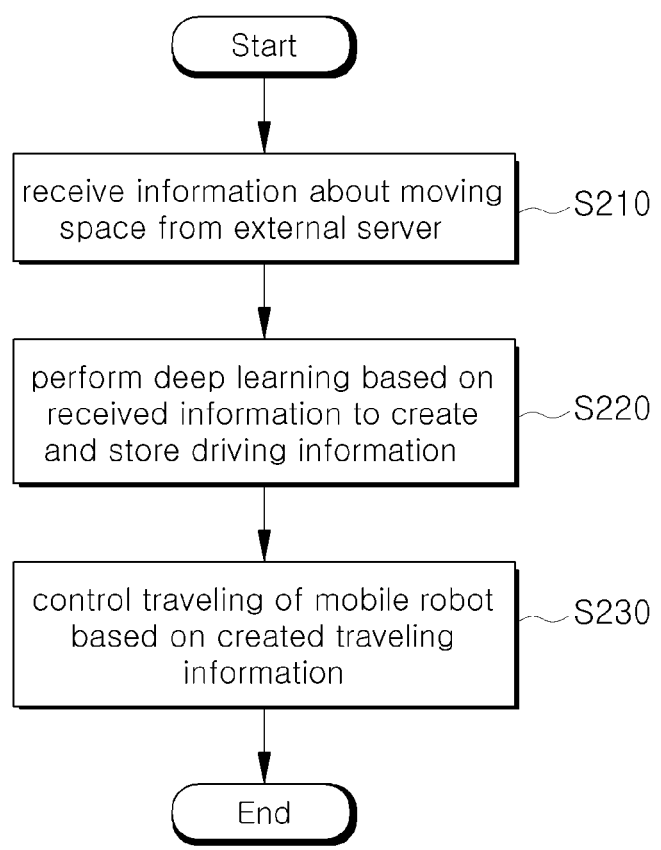
FIG. 6 is a flowchart showing a control method of the mobile robot according to an embodiment of the present disclosure.

FIG. 5 is a block diagram showing a configuration of a mobile robot 100, and FIG. 6 is a flowchart illustrating a control method of the mobile robot 100.

Referring to FIG. 5, the mobile robot 100 may include a controller 110, a user interface 120, a sensor portion 130, a communication device 140, a location detector 150, a plurality of driving portions 160, an operation portion 170, and a storage device 180.

The mobile robot 100 shown in FIG. 5 may be the same as the mobile robot system 1 shown in FIG. 3, except that it does not include the server 400, and the features of components of the mobile robot 100 shown in FIG. 5, except for the communication device 140 and the controller 110, have been described above with reference to FIG. 3. Accordingly, descriptions about the components having the above-described features will be omitted, and the communication device 140 and the controller 110 will be described below.

The communication device 140 may receive information about moving space on which the mobile robot 100 is to travel, from an external server. The external server may store information about the moving space received from another external robot through wireless communication.

If the communication device 140 receives information about moving space from the external server, the controller 110 may create traveling information about the moving space on which the mobile robot 100 is to travel, based on the information about the moving space.

More specifically, the controller 110 may perform deep-learning based on the information about the moving space to create traveling information. Then, the controller 110 may control the driving portions 160 of the mobile robot 100 or the operation portion 170 based on the traveling information.

In the mobile robot system 100 shown in FIGS. 3 and 4, the server 400 performs deep learning based on information about moving space received from an external robot to crate traveling information, however, the mobile robot 100 shown in FIG. 5 may receive information about moving space from an external server, and itself perform deep learning based on the information about the moving space to create traveling information.

FIG. 6 is a flowchart illustrating a control method of the mobile robot 100 shown in FIG. 5.

Referring to FIG. 6, the mobile robot 100 may receive traveling information about moving space stored in an external server from the external server, in operation S210.

The traveling information may include at least one of various information (for example, operation information of a sensor, traveling speed information, and traveling direction information) acquired when an external robot travels on the moving space, and also include the result of traveling acquired when the external robot performs virtual simulation.

If the information about the traveling space is received, the mobile robot 100 may perform deep learning based on the information about the traveling space to create and store traveling information for the traveling space, in operation S220.

Thereafter, the mobile robot 100 may control traveling based on the traveling information, in operation S230.

Also, although not shown in the drawings, the traveling information created through the deep learning may be stored in the mobile robot 100, or transmitted to the external server and stored in the external server. If the traveling information is transmitted to the external server, a user can receive and use the traveling information stored in the external server when the traveling information stored in the mobile robot 100 is deleted or when the user replaces the mobile robot 100 with another one, so as to quickly control the mobile robot 100.

So far, the configuration and operation flow of the mobile robot system 1 and the mobile robot 100 have been described with reference to the accompanying drawings. Hereinafter, deep learning that is applied to the present disclosure will be described with reference to the accompanying drawings.

Figure 7:
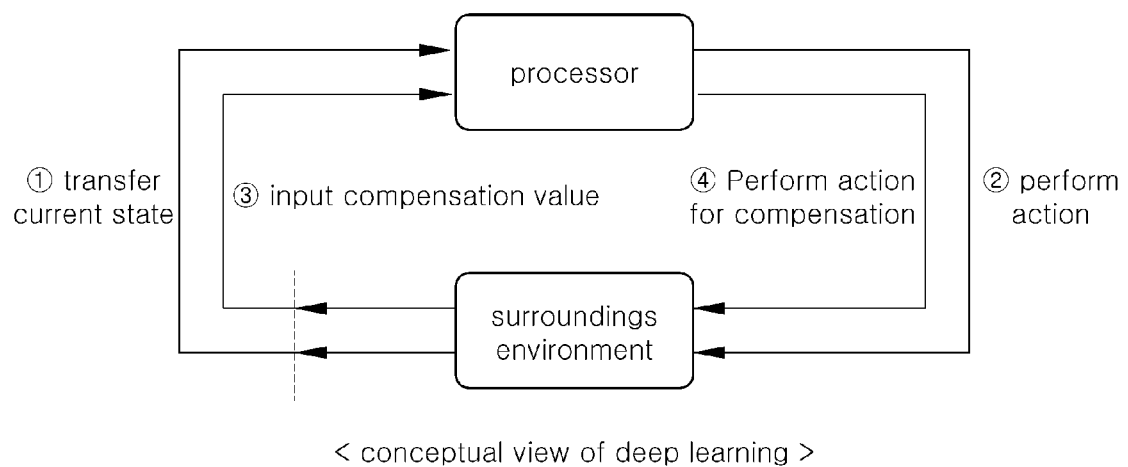
FIG. 7 is a conceptual view of deep learning.
Figure 8:
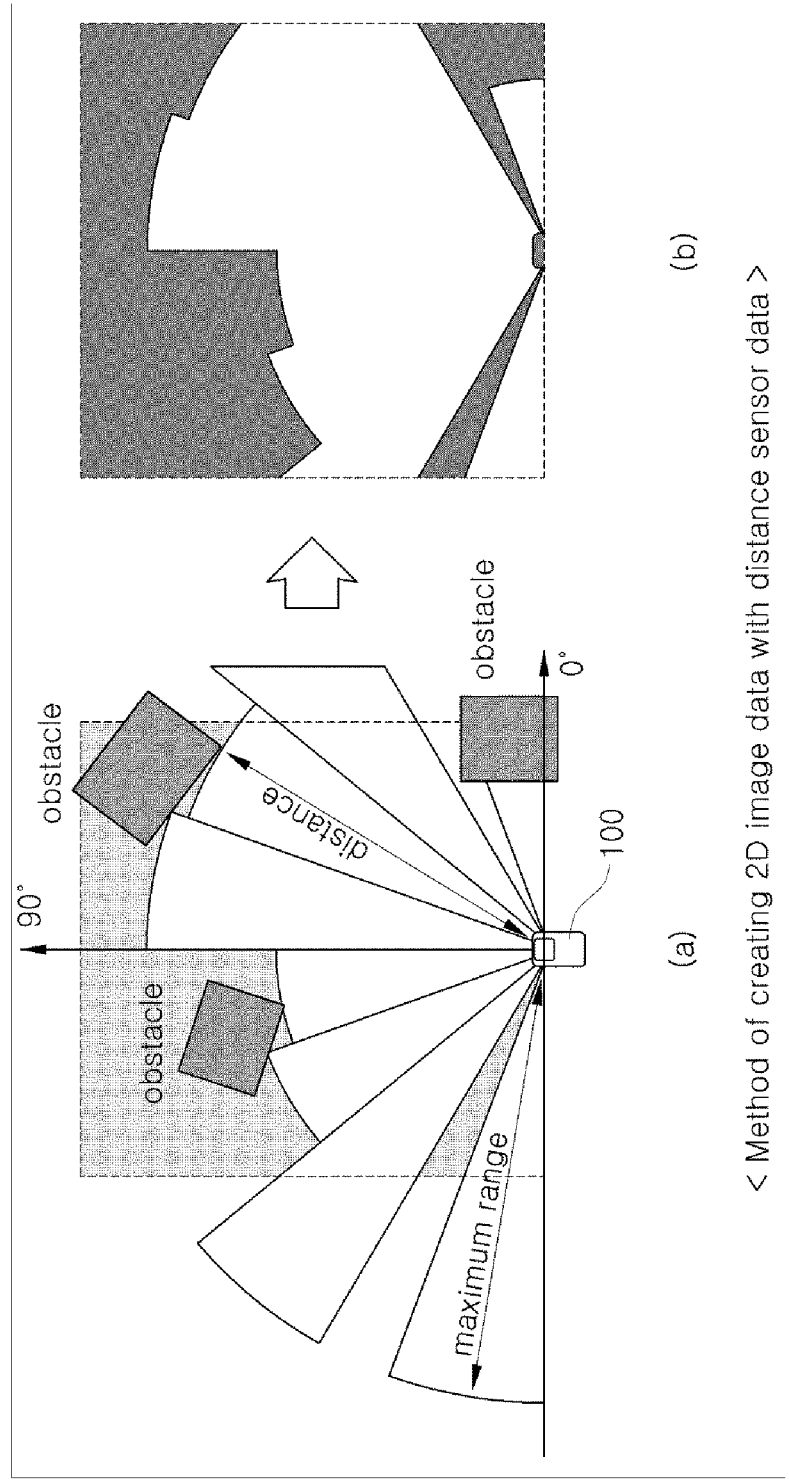
FIG. 8 is a view for describing a method of creating 2D image data with distance sensor data, as a process of deep learning.
Figure 9:
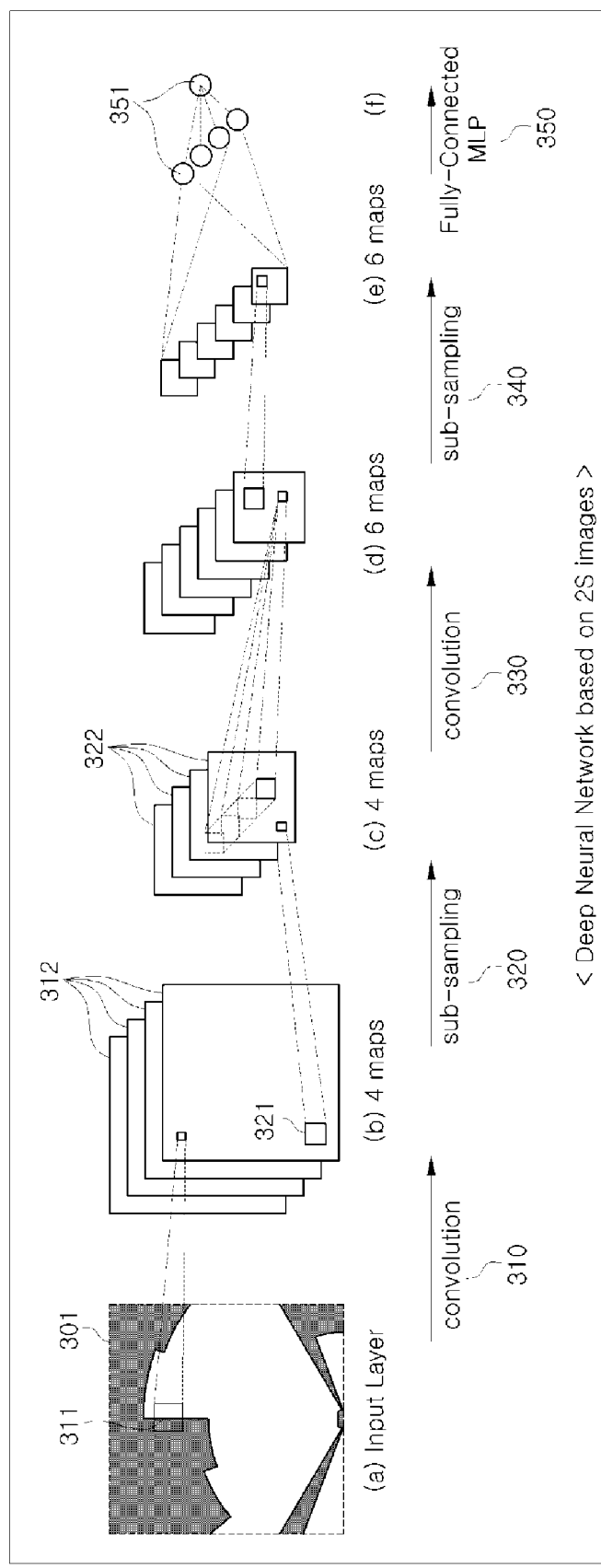
FIG. 9 is a view for describing a process of performing deep learning based on images created according to the method shown in FIG. 8.

FIG. 7 is a conceptual view of deep learning, FIG. 8 is a view for describing a method of creating 2D image data with distance sensor data, as a process of deep learning, and FIG. 9 is a view for describing a process of performing deep learning based on images created according to the method shown in FIG. 8.

Deep learning represents a group of algorithms for machine learning that tries a high level of abstractions (a task of summarizing fundamental context or functions from a large amount of data or complex materials) by combining various nonlinear transformation techniques.

More specifically, the deep learning is a learning method for representing certain learning data as a format (for example, column vectors represented from pixel information of an image) which the computer can understand and for many studies (how to make a better representation method and how to make a model for learning) for applying the format to learning. The deep learning may include Deep Neural Networks (DNN) and Deep Belief Networks (DBN).

Accordingly, the deep learning does not give definite output data for input data. That is, the deep learning is a method of deciding a compensation value according to a compensation function for an action although it is unsupervised learning or an unsupervised process.

Referring to FIG. 7, the deep learning may recognize a surroundings environment, and transfer a current environmental state to a processor. The processor may perform an action according to the current environmental state, and the surroundings environment may inform the processor of a compensation value according to the action. The processor may select an action capable of acquiring a maximum compensation value. Through this process, learning may be performed.

As described above, learning data used for deep learning may be a result acquired when a robot travels actually, or data acquired when a robot simulates traveling. When a robot simulates traveling, the robot can more quickly acquire data by adjusting simulation speed.

Also, deep learning may be performed by a DNN algorithm. FIGS. 8 and 9 are views for describing the DNN.

In order to create traveling information through deep learning, it is necessary to acquire information about moving space. Accordingly, as shown in FIG. 8, the mobile robot 100 may create 2D image data with 1D distance sensor data.

That is, in order to create traveling information, input data may need to be designed. The speed, traveling direction, and distance sensor values of a mobile robot may be used as input data. Values measured by a distance sensor may be given as polar coordinates, that is, distance and direction values. The measured values may be input as 1D values to a network, or the measured values may be created as a 2D image and then input, as shown in FIG. 8.

FIG. 9 is a view for describing a DNN algorithm for deep learning.

The DNN may be embodied as a deep neural network in which a plurality of hidden layers exist between an input layer and an output layer, as a convolutional neural network that forms a connection pattern between neurons similarly to an animal's visual cortex structure, or as a recurrent neural network that stacks neural networks every second according to time.

More specifically, the CNN is to repeat convolution and sub-sampling to reduce and distort an amount of data, thereby classifying neural networks. That is, the CNN outputs the results of classification through feature extraction and classification, and is mainly used to analyze images.

The convolution means image filtering, and uses a mask 311 having weights.

Referring to FIG. 9, first convolution 310 may lay the mask 311 on an input image 301, then multiply pixel values of the input image 301 by the weights of the mask 311, and calculate the resultant sums as pixel values of an output image 312.

A plurality of masks 311 may be laid on individual parts of the input image 301, and a sum of results calculated when the masks 311 move may be extracted. Accordingly, at least one image may be extracted to induce robust characteristics (adaptive to changes in environment, such as distortion or deformation).

According to the example of FIG. 9, 4 output images (feature maps) 312 may be extracted by the first convolution 310.

Sub sampling means a process of reducing the sizes of images. For example, sub sampling may use Max Pool. The Max Pool is a technique of selecting a maximum value in a specific area, and similar to a method in which neurons responds to a greatest signal. The sub sampling is to reduce noise and increase learning speed.

For example, the sub sampling 320 may be performed in such a way to select an area for Max Pool from the output images output from the first convolution 310 and to output a maximum value from pixel values of the area.

In FIG. 9, four output images 322 may be output by the first sub sampling 320.

Meanwhile, the CNN may repeatedly perform convolutions 310 and 330 and sub-sampling 320 and 340. The number of repetition is not limited. That is, in FIG. 10, the number of repetition is two, however, the number of repetition is not limited to two.

Finally, the CNN may perform Fully-Connected MLP 350. The Fully-Connected MLP 350, which is to reduce time of a learning increase and to reduce the size of the network and the number of variables, may transform the output images 312 and 322 which may be a plurality of images to 1D matrices 351. The matrices 351 may be mapped at an input terminal.

For example, if a plurality of cat images are subject to CNN, the cat images can be distinguished from among cat images and dog images.

So far, a method of performing deep learning through a server, and efficiently driving through the deep learning has been described. Hereinafter, a method of efficiently dealing with an object through the server 400 will be described.

Figure 10:
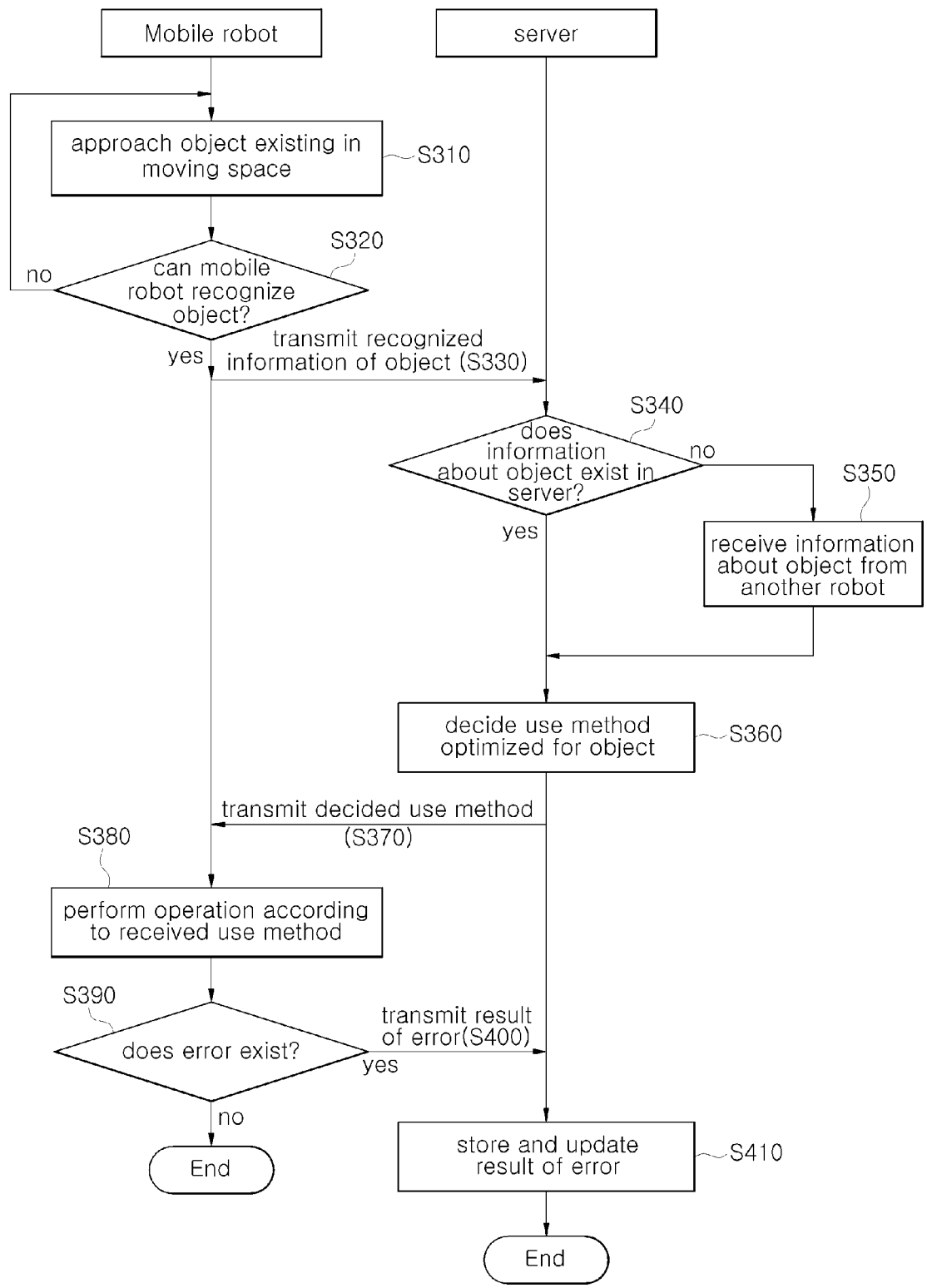
FIG. 10 is a flowchart showing a control flow of a mobile robot system according to another embodiment of the present disclosure.

FIG. 10 is a flowchart showing the control flow of a mobile robot system according to another embodiment of the present disclosure. The structure of a mobile robot system 1 according to the current embodiment is the same as that of the mobile robot system 1 shown in FIG. 3. Accordingly, only the control flow of the mobile robot system 1 according to the current embodiment will be described below.

Referring to FIG. 10, the mobile robot 100 may determine whether an object exists on moving space to which the mobile robot 100 is to move, and if the mobile robot 100 determines that an object exists on the moving space, the mobile robot 100 may approach the object to determine whether it can recognize the object, in operations S310 and S320.

The object may be recognized by an identifier attached thereon, or information about the object may be recognized through information related to an identifier, for example, image information, sound information, etc.

If the mobile robot 100 determines that it can recognize the object, the mobile robot 100 may transmit the recognized information to the server 400, in operation S330.

If the recognized information is received, the server 400 may search for information about the object.

The information about the object may include various characteristics of the object or information about the object received from users. The information about the object may be transmitted to the mobile robot 100, and the mobile robot 100 may efficiently deal with the object based on the information.

For example, the information about the object may include careful handling, a weight and size of the object, etc. Also, the information about the object may include information about the object input by a user.

In this case, since users can share use information of the object, it is possible to increase information and knowledge about the object.

If no information about the object exists, the server 400 may receive information about the object from another robot, in operation S350.

The information about the object may include information about the object input by another user, or information acquired when another mobile robot deals with the object. If the server has already received and stored information about the object from another external robot, before operation S350, operation S350 may be omitted.

If the server 400 determines in operations S340 and S350 that information about the object has been received, the server 400 may decide a use method optimized for the object based on the information about the object, and transmit the decided use method to the mobile robot 100, in operations S360 and S370.

The mobile robot 100 may perform a user's command based on the received information, in operation S380.

For example, if the mobile robot 100 receives a user's command for moving a specific object, the mobile robot 100 may perform the user's command based on the information about the object received from the server 400. Since the information about the object can include the characteristics, size, or weight of the object or careful handling, the mobile robot 100 may efficiently perform the user's command based on the information about the object.

If an error is generated when operation is performed in operation S380, the mobile robot 100 may transmit the result of the error to the server 400, in operations S390 and S400.

The result of the error may be stored in the server 400, and other users may refer to the result of the error or update the error in order to use it later, in operation S410.

Since the mobile robot system 1 described with reference to FIG. 10 shares information about an object with other users, it is possible to more efficiently deal with the object.

However, if information about an object is shared thoughtlessly, a problem of a violation of a user's privacy may occur. Accordingly, in the present disclosure, information about an object set in advance by a user may be not transmitted to the server 400, thereby preventing a problem of a violation of the user's privacy.

That is, if the user sets a specific object as an object that cannot be recognized by the mobile robot 100, the mobile robot 100 cannot recognize the specific object although it approaches the specific object in operations 310 and 320, and accordingly, cannot transmit information about the object to the server 400. Accordingly, it is possible to prevent a problem of a violation of the user's privacy.

According to another embodiment, the user may designate an area or an object on which automatic cleaning should not be performed in a cleaning robot in order to clean only a desired area or object.

So far, the configurations, features, and effects of the mobile robot system 1 and the mobile robot 100 according to the embodiments of the present disclosure have been described with reference to the accompanying drawings.

Since a typical mobile robot system based on supervised learning receives information requested from a mobile robot from an external server, the mobile robot system can neither actively receive nor reflect actual information required for traveling of the mobile robot, and accordingly, cannot improve traveling technology. Due to the problem, since the mobile robot cannot acquire sufficient information about new space it moved to, the mobile robot has many difficulties in traveling efficiently.

However, since the mobile robot 100 according to the embodiment of the present disclosure can travel based on traveling information learned by another mobile robot, the mobile robot 100 can travel safely even in new space that it has never experienced. Also, since the mobile robot 100 continues to learn traveling information, the mobile robot 100 can perform more intelligent traveling.

Although the present disclosure has been described based on the limited embodiments and drawings, various corrections and modifications from the above description can be made by one of ordinary skill in the art. For example, although the above-described techniques are performed in a different order from that of the above-described method, and/or the above-described components, such as system, structure, apparatus, and circuit, are coupled or combined in a different form from that of the above-described method, or replaced or substituted with other components or equivalents, proper results can be achieved. Therefore, the scope of claims which will be described below may cover other implementations, embodiments, and equivalents of the claims.

What is claimed is:

1. A mobile robot system comprising:
a mobile robot for traveling in a moving space; and
a server configured to receive information about the moving space from at least one external robot that is different from the mobile robot, and create first traveling information for the mobile robot based on at least the information about the moving space from the external robot,
wherein the server is configured to perform deep learning based on the information about the moving space to create the first traveling information using a Deep Neural Network (DNN), stored on the server, via repeated convolutions and sub-samplings,
wherein the mobile robot comprises:
a driving portion, including at least one wheel, configured to move the mobile robot;
a sensor portion configured to recognize objects existing in the moving space; and
a controller configured to create second traveling information based on the first traveling information and information about the recognized objects in the moving space, wherein the second traveling information includes a traveling path in the moving space and is created using a DNN stored on the mobile robot, and control the driving portion to move the mobile robot according to the traveling path in the moving space included in the created second traveling information,
wherein the information about the moving space includes information created based on a simulation of the mobile robot or the external robot traveling on the moving space, and
wherein a learning level of the Deep Neural Network (DNN) stored on the server is higher than that of the DNN stored on the mobile robot.

2. The mobile robot system according to claim 1, wherein the information about the moving space is traveling-related information acquired when the external robot travels on the moving space.

3. The mobile robot system according to claim 1, wherein the mobile robot is configured to transmit the information about the moving space acquired when the mobile robot travels, to the server.

4. The mobile robot system according to claim 1, further comprising:
an operation portion, comprising circuitry, configured to convey the objects,
wherein the server is configured to receive and store information about the objects from at least one of the robot and the external robot.

5. The mobile robot system according to claim 4, wherein if no information about the objects exists, the mobile robot is configured to receive information about the objects from the server, and
the controller is configured to control at least one of the driving portion and the operation portion based on the received information about the objects.

6. The mobile robot system according to claim 1, wherein the mobile robots does not transmit information about objects set by a user.

7. A mobile robot comprising:
a main body;
a driving portion including at least one wheel configured to move the main body;
a sensor portion configured to recognize objects existing in a moving space;
a controller configured to transmit information about moving space to an external server and receive, from the server, first traveling information about the moving space created based on the information about the moving space; and
the controller is configured to create second traveling information including a traveling path in the moving space based on the first traveling information and information about the recognized objects in the moving space, and to control the driving portion to move the main body according to the traveling path in the moving space included in the created second traveling information,
wherein the first traveling information is created based on information about the moving space received from at least one another external robot different from the mobile robot; and
wherein the first traveling information is created using deep learning based on the information about the moving space using a Deep Neural Network (DNN), stored on the server, via repeated convolutions and sub-samplings, and the controller is configured to perform deep learning based on the first traveling information and information about the recognized objects in the moving space to create the second traveling information using a DNN stored on the mobile robot,
wherein the information about the moving space includes information created based on a simulation of the mobile robot or the external robot traveling on the moving space, and
wherein a learning level of the Deep Neural Network (DNN) stored on the server is higher than that of the DNN stored on the mobile robot.

8. The mobile robot according to claim 7, wherein the information about the moving space includes traveling-related information acquired when the external robot travels on the moving space.

9. The mobile robot according to claim 8, wherein the traveling-related information includes at least one of operation information of a sensor installed in the external robot, traveling speed information, and traveling direction information, acquired when the external robot travels on the moving space.

10. A method of controlling a mobile robot comprising a main body, a driving portion including at least one wheel configured to move the main body, a sensor and a controller, comprising:
receiving, by a server, information about a moving space from at least one external robot;
creating, by the server, first traveling information about the moving space based on the information about the moving space from the external robot;
recognizing, using the sensor, objects in the moving space;
creating, by the controller, second traveling information including a traveling path in the moving space based on the first traveling information and information about the recognized objects in the moving space; and
controlling, by the controller, the driving portion to move the main body of the mobile robot according to the traveling path in the moving space included in the second traveling information, the mobile robot being different than the external robot,
wherein deep learning is performed based on the information about the moving space to create the first traveling information using a Deep Neural Network (DNN) stored on the server, via repeated convolutions and sub-samplings, and
wherein deep learning is performed based on the first traveling information and information about the recognized objects in the moving space to create the second traveling information using a DNN stored on the mobile robot,
wherein the information about the moving space includes information created based on a simulation of the mobile robot or the external robot traveling on the moving space, and
wherein a learning level of the Deep Neural Network (DNN) stored on the server is higher than that of the DNN stored on the mobile robot.

11. The method according to claim 10, wherein the information about the moving space is traveling-related information acquired when the external robot travels on the moving space.

12. The method according to claim 10, further comprising transmitting information about the moving space acquired when the mobile robot travels, to the server.

13. The mobile robot system according to claim 1, wherein the DNN used by the server corresponds to the DNN used by the controller of the mobile robot.

14. The mobile robot system according to claim 1, wherein the mobile robot includes a relatively low level of a learning machine-based controller and the server includes a relatively high level of a learning machine-based controller.

15. The mobile robot system according to claim 1, wherein the mobile robot is a cleaning robot and the traveling path identifies a path to clean an area of the moving space.

* * * * *